United States Patent [19]
Reinhardt

[11] Patent Number: 5,598,565
[45] Date of Patent: Jan. 28, 1997

[54] METHOD AND APPARATUS FOR SCREEN POWER SAVING

[75] Inventor: Dennis Reinhardt, Palo Alto, Calif.

[73] Assignee: Intel Corporation, Santa Clara, Calif.

[21] Appl. No.: 174,769

[22] Filed: Dec. 29, 1993

[51] Int. Cl.$^6$ .................... G06F 1/30; G09G 3/36
[52] U.S. Cl. ............ 395/750; 345/90; 345/212; 345/214
[58] Field of Search .................... 395/750, 275; 345/90, 92, 102, 211, 212, 214

[56] References Cited

U.S. PATENT DOCUMENTS

| | | | |
|---|---|---|---|
| 5,012,274 | 4/1991 | Dolgoff | 340/702 |
| 5,136,695 | 8/1992 | Goldshlag et al. | 395/275 |
| 5,241,680 | 8/1993 | Cole et al. | 395/750 |
| 5,359,345 | 10/1994 | Hunter | 345/102 |

OTHER PUBLICATIONS

Gary Stix, "Manufacturing hurdles Challenge large–LCD developers", Sep. 1989, pp. 36–40, IEEE Spectrum.

*Primary Examiner*—Jack B. Harvey
*Assistant Examiner*—Jeffrey K. Seto
*Attorney, Agent, or Firm*— Blakely, Sokoloff, Taylor & Zafman

[57] ABSTRACT

A flat panel display power management system for a flat panel display screen in a portable electronic device is disclosed. The flat panel display power management system is capable of controlling the amount of power delivered to each pixel on the flat panel display screen. The portable electronic device can select a subset of important pixels that will continue to receive more power than the remaining pixels if the flat panel display power management system enters a reduced power mode. When the electronic device system determines that the user has been inactive for a predetermined amount of time or if the user manually requests low power mode, the flat panel display power management system enters the reduced power mode. In the reduced power mode, the flat panel display power management system reduces the power provided to the pixels that are not within the subset of important pixels.

18 Claims, 12 Drawing Sheets

METHOD AND APPARATUS FOR SCREEN POWER SAVING

FIELD OF THE INVENTION

The present invention relates to flat panel display systems for portable electronic devices. More specifically, the present invention relates to methods and apparatus for reducing the amount of power consumed by flat panel display system in portable electronic devices.

BACKGROUND OF THE INVENTION

Portable electronic devices must be capable of operating only upon power obtained from an internal electric battery. To keep the weight low, the batteries used in portable electronic devices must be small. Since small electric batteries can only provide limited amounts of power, portable electronic devices should be designed in manner such that power consumption is minimized.

Some existing portable electronic devices implement power management systems that reduce the amount of power consumed. For example, many portable computer systems contain power management systems that reduce the amount of power consumed by hard disk drive storage devices. The power management system monitors the use of the hard disk drive storage device. If the power management system determines that the hard disk drive has been inactive for a predetermined amount of time, the power management system parks the read/write head of the hard disk drive and spins down the physical hard disk.

Many portable electronic devices use some type of flat panel display system to display information to a user. For example, portable computers, portable televisions, and hand-held video games are constructed using a flat panel display system. Examples of flat panel display systems include active matrix liquid crystal displays, passive matrix liquid crystal displays, electroluminescent displays, field-emission cathode displays, gas-plasma displays, Light Emitting Diode (LED) displays, and Liquid Crystal displays (LCD).

The flat panel display system in a portable electronic device can draw significant amounts of power. It is therefore desirable to implement a power management system that reduces the amount of power consumed by the flat panel display system in a portable electronic device.

SUMMARY OF THE INVENTION

It is therefore the object of the present invention to reduce the amount of power used by the flat panel display system of a portable electronic device.

It is a further object of the present invention to reduce the amount of power used by the flat panel display system while retaining important information on the flat panel display system.

Other objects, features and advantages of the present invention will be apparent from the accompanying drawings, and from the detailed description that follows below. The present invention comprises a flat panel display power management system for a flat panel display system in a portable electronic device. The flat panel display power management system of the present invention is capable of controlling the amount of power delivered to each pixel on the flat panel display screen.

The portable electronic device selects a subset of important pixels that will continue to receive full power if the flat panel display power management system enters a reduced power mode. In the case of a portable computer system, the software running on the portable computer system can select the subset of important pixels.

When the portable electronic system determines that the user has been inactive for a predetermined amount of time, the flat panel display power management system enters the reduced power mode. In the reduced power mode, the flat panel display power management system significantly reduces the amount of power provided to the pixels that are not within the subset of important pixels. The amount of power provided to the pixels in the subset of important pixels may also be reduced for additional power savings.

Alternatively, the user can manually request the portable electronic system to enter the reduced power mode. For example, if a user only needs to view a small portion of the flat panel display system, the user may request the portable electronic system to provide full power to the pixels within that small portion of the flat panel display system.

BRIEF DESCRIPTION OF THE DRAWINGS

The present invention is illustrated by way of example and not limited by the figures of the accompanying drawings in which like references indicate similar elements, and in which.

DETAILED DESCRIPTION

The present invention discloses methods and apparatus for reducing the amount of power drawn by a flat panel display system. In the following description, for purposes of explanation, specific nomenclature is set forth to provide a thorough understanding of the present invention. Furthermore, well known circuits and devices are shown in block diagram form in order not to obscure the present invention unnecessarily. Moreover, it will be apparent to one skilled in the art that these specific details are not required in order to practice the present invention.

The present invention is disclosed in the context of a portable computer device that incorporates a flat panel display system for displaying information. However, it will be appreciated by those skilled in the art that the teachings of the present invention can be incorporated into any electronic device that incorporates a flat panel display system.

A Portable Computer Device

Figure 1:
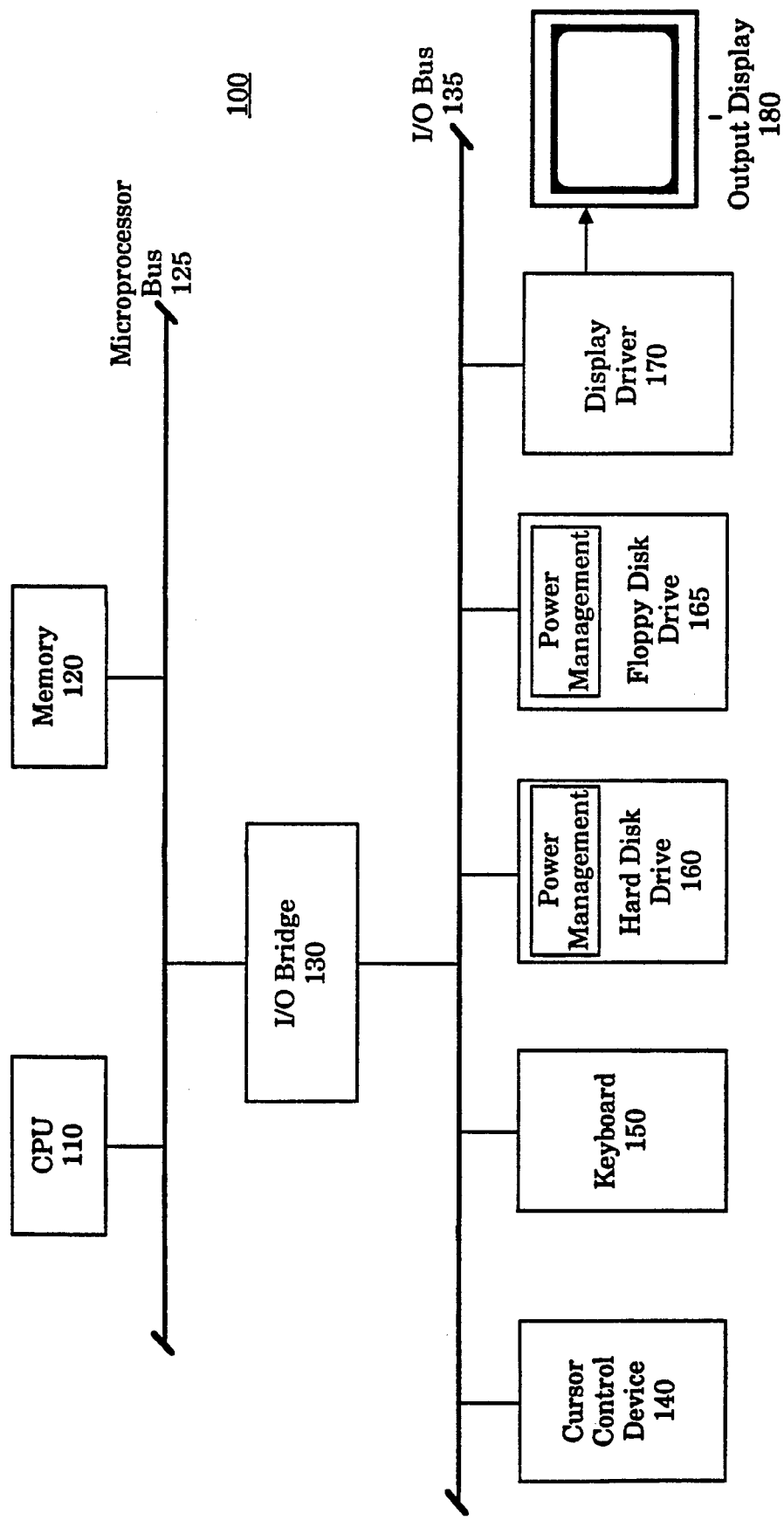
FIG. 1 illustrates a portable computer system.

FIG. 1 illustrates a block diagram of typical portable computer device 100. The portable computer device 100 comprises a computer processor 110 coupled to a main memory 120 and an Input/Output (I/O) Bridge 130.

The Input/Output (I/O) Bridge 130 of portable computer device 100 drives several input and output devices coupled to an I/O bus 135. For example, the portable computer device 100 illustrated in FIG. 1 comprises cursor control device 140 and keyboard 150 as input devices; hard disk drive 160 and floppy disk drive 165 as storage devices (input and output); and display driver 170 driving an output display 180 as an output device.

In order to be portable, the portable computer device 100 must be capable of operating only upon power obtained from an internal battery. Since batteries can only provide limited amounts of power, the portable computer device 100 must be designed in a manner that minimizes power consumption.

Existing portable computer devices use power management systems to reduce the power used by inactive storage devices or completely turn such devices off. Referring to the portable computer device 100 of FIG. 1, the Hard Disk Drive 160 and Floppy Disk Drive 165 both have power management systems.

In the Hard Disk Drive 160, the power management system senses how long the Hard Disk Drive 160 has been inactive. If the power management system determines that the Hard Disk Drive 160 has been inactive for a predetermined amount of time, the power management system parks the read/write head(s), spins down the physical hard disk, and removes power.

The output display 180 of most portable computer devices comprises a flat panel display system. The flat panel display system can draw significant amounts of power from the battery used to power the portable computer device 100. It is therefore desirable to implement a method of reducing the power consumed by the flat panel display system of the portable computer device 100.

The Flat Panel Screen Power Management System

Several flat panel display systems operate by providing power to each individual pixel creating the image on the flat panel display that is to be displayed. The power provided to each pixel in such systems causes the pixel to emit a point of light. Examples of light emissive flat panel systems include electroluminescent displays, field-emission cathode displays, color gas-plasma displays, and Light Emitting Diode (LED) displays.

Figure 2:
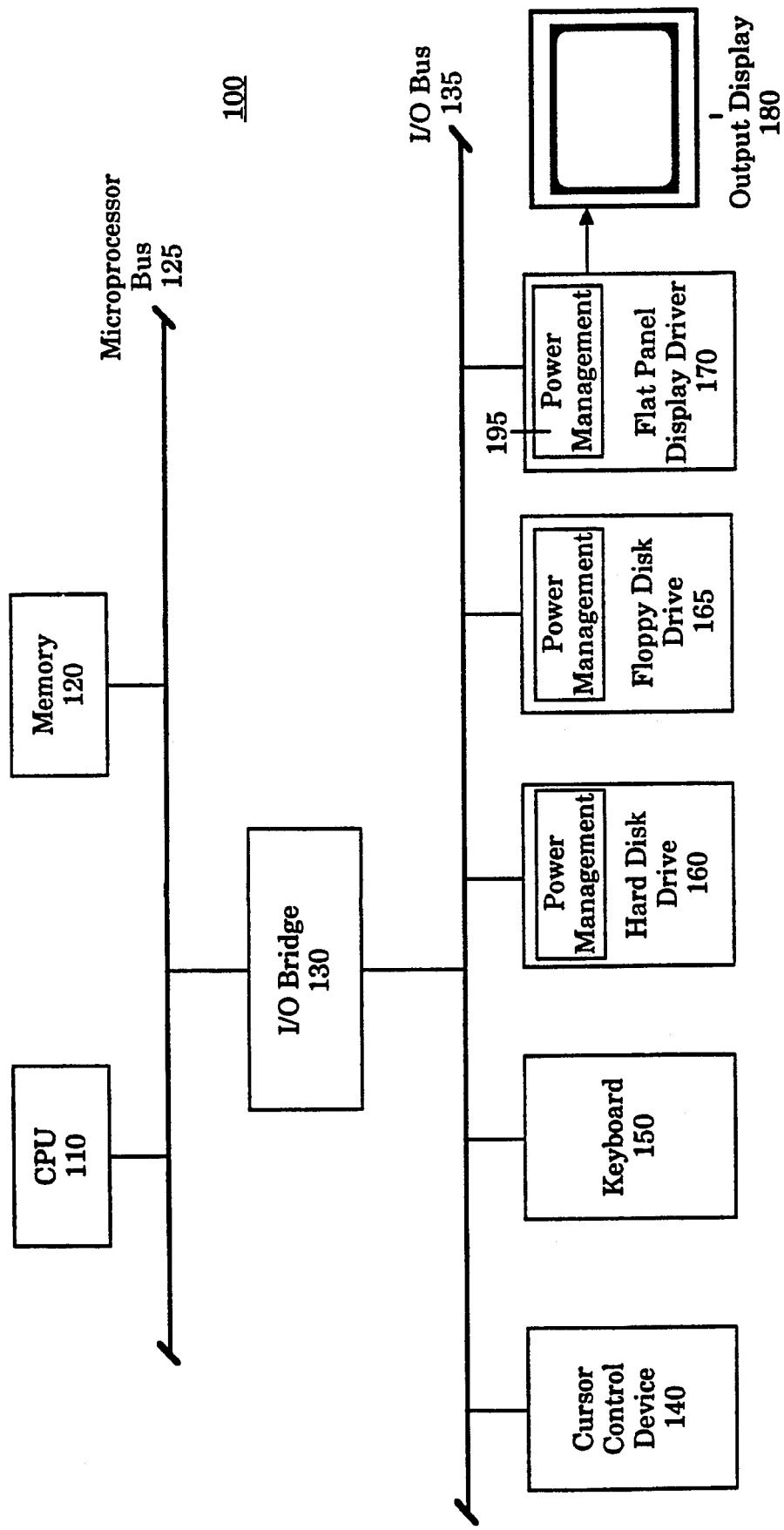
FIG. 2 illustrates a portable computer system with a flat panel display power management system for controlling the amount of power consumed by the flat panel display system.

To reduce the amount of power consumed by a light emissive flat panel display system, the present invention introduces a flat panel display power management system that is capable of controlling the amount of power provided to each individual pixel on the display. FIG. 2 illustrates the portable computer device 100 of FIG. 2 with the added flat panel display power management system 195. To conserve power in a portable computer device that uses a light emissive flat panel display system, the flat panel display power management system 195 reduces the amount of power provided to certain pixels on the flat panel display screen.

Other flat panel display systems operate by overlaying a matrix of pixels on top of a backlight. Such flat panel display systems generate an image by selectively allowing the backlight through the matrix of pixels. Examples of flat panel display systems that operate using a backlight include active matrix Liquid Crystal Displays (AMLCD) and passive matrix Liquid Crystal Displays (LCD).

To reduce the amount of power consumed by a flat panel display system that operates using a backlight, the flat panel display power management system 195 of the present invention can be configured to reduce the refresh rate of the flat panel display system. For example, the flat panel display power management system 195 may reduce the frame rate such that the display is updated half as often as normal. Alternatively, the flat panel display power management system 195 may reduce the frame updates to pixels in unimportant areas. Although, this specification will focus on reducing the power consumed by light emissive flat panel display systems, the teachings are also applicable to backlighted flat panel displays.

The flat panel display power management system of the present invention can be invoked by the operating system of the portable computer device 100. The operating system monitors the input devices utilized by a user. For example, in the portable computer device 100 illustrated in FIG. 2, the operating system of the portable computer device 100 monitors the keyboard 150 and cursor control 140 input devices. If the input devices have been inactive for a predetermined time limit, the operating system instructs the flat panel display power management system 195 of the present invention to enter its power conservation mode.

Alternatively, the flat panel display power management system 195 can be configured such that a user can manually control when the power conservation mode is entered. Providing control to the user allows the user to reduce the power consumed by the flat panel display in situations where the user is willing to trade reduced visibility of the screen for additional operating time while operating off of a battery.

The flat panel display power management system 195 of the present invention is context sensitive such that the flat panel display power management system 195 attempts to reduce screen power in a manner that is least offensive to the user. Specifically, the flat panel display power management system 195 of the present invention attempts to reduce the power provided to pixels that are the least important to the user while providing more power to the pixels in the area of the screen where the user's attention is focused.

The flat panel display power management system 195 of the present invention allows each individual software program to determine which pixels are important to the user and which pixels are not as important. Each software program can continually adjust the settings of the flat panel display power management system 195 such that different pixels are considered important at different times. An example of this effect is provided with reference to FIGS. 3a, 3b, 3c, 3d, 3e and 3f.

Figure 3A:
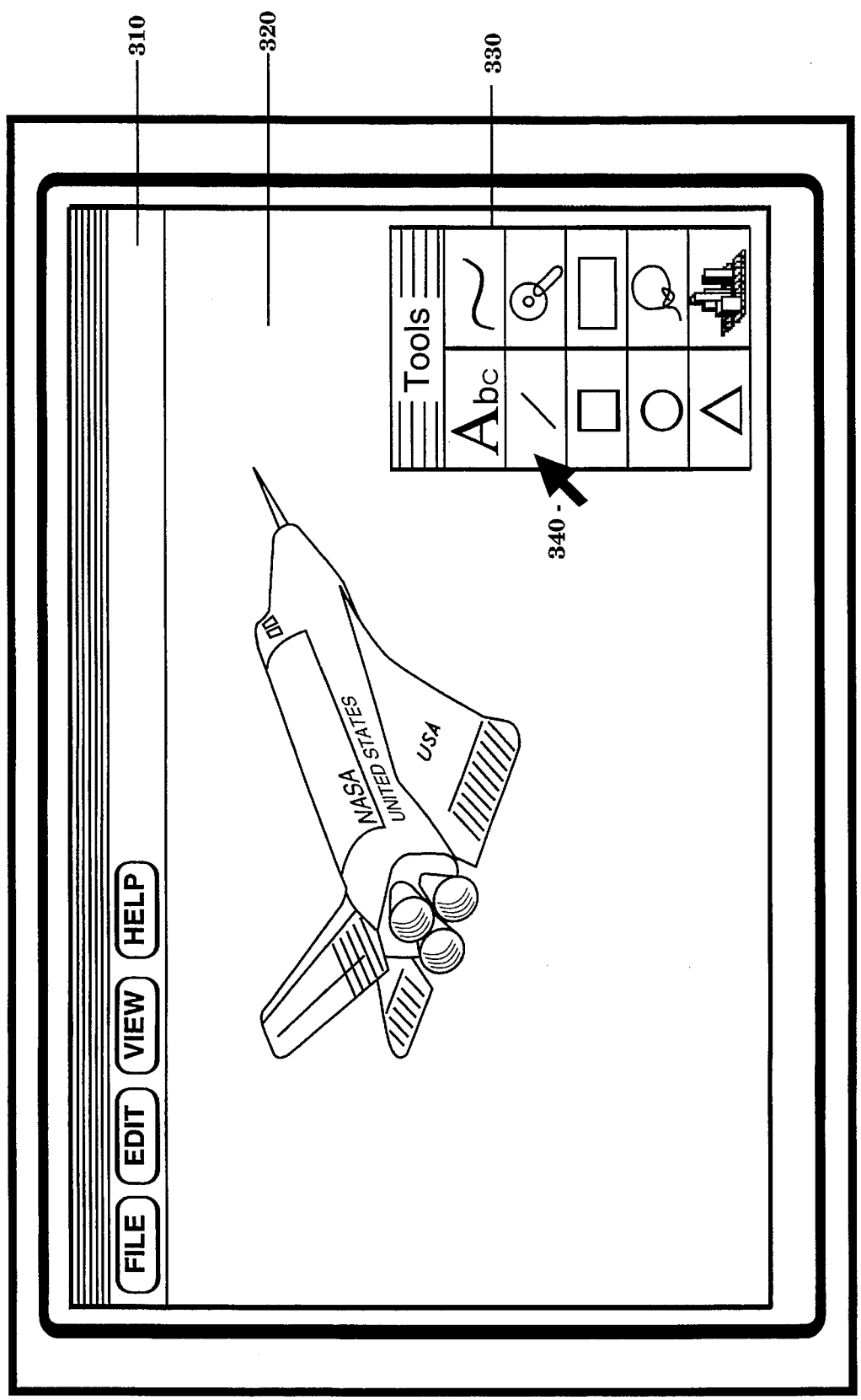
FIG. 3a illustrates a screen display of drawing program running on a portable computer system.

Referring to FIG. 3a, a drawing program is illustrated on a computer screen. The drawing program consists of a main drawing area 320, a toolbar 330, and a pull-down menu area 310. To operate the drawing program, a user controls a cursor 340 over the various control areas. To draw in the main drawing area 320 a user moves the cursor within the main drawing area 320. To select various drawing functions, a user moves the cursor 340 to the toolbar 330 and selects a drawing tool. To select other available functions, the user places the cursor on the pull-down menu 310.

The drawing program selects the important pixels based upon where the cursor 340 is placed on the display screen. When the flat panel display power management system 195 is enabled by the user or the operating system, the flat panel display power management system 195 provides reduced power to the pixels not in the selected set of important pixels. The selected important pixels may received full power such that the selected important pixels will easily be visible. Alternatively, the selected important pixels may also receive less power than in a normal operating mode such that additional power savings are achieved.

Figure 3B:
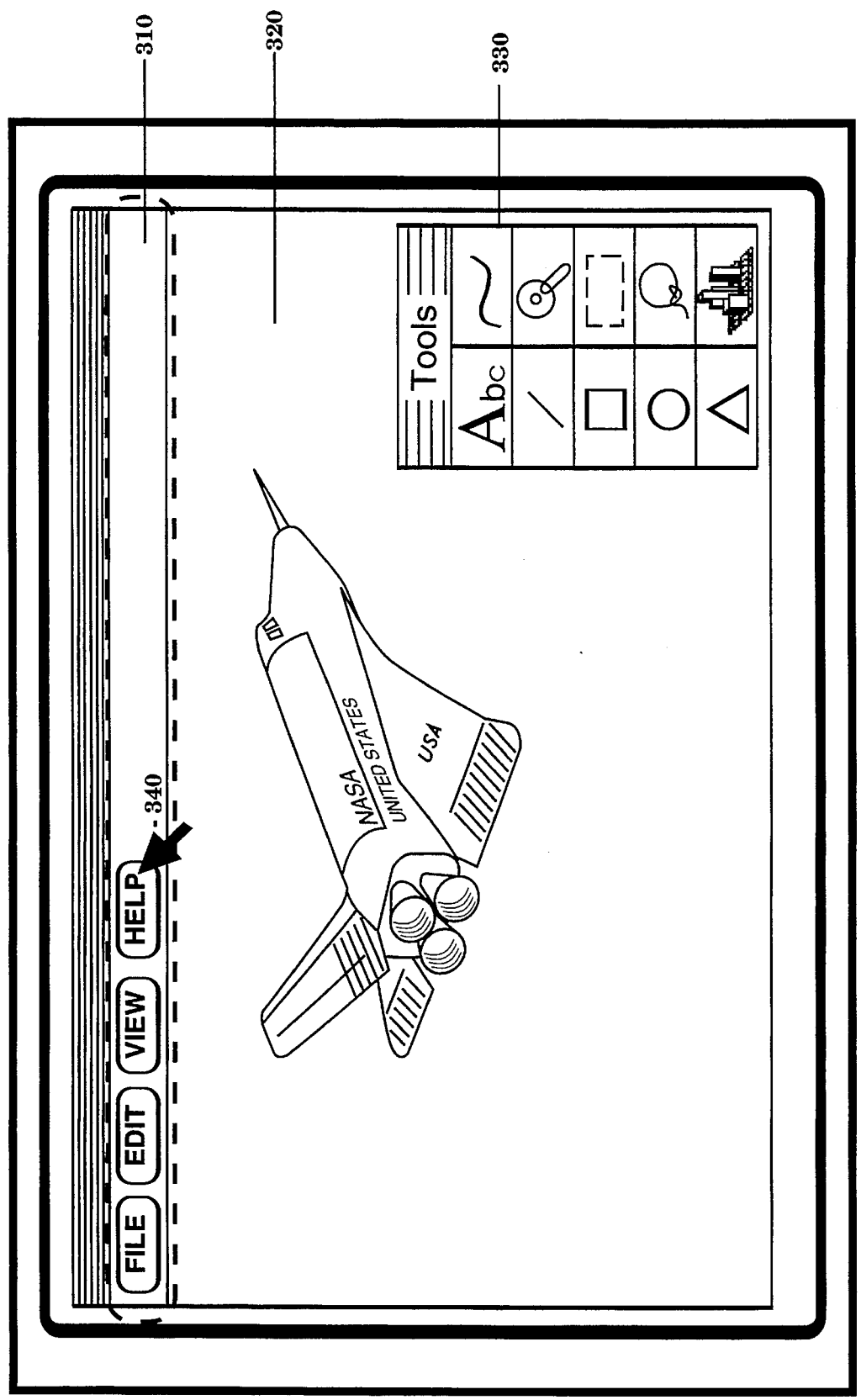
FIG. 3b illustrates the screen display of a portable computer system of FIG. 3a when the flat panel display power management system is activated and the cursor is on the pull-down menu.

FIG. 3b illustrates how the display screen appears when the user or the operating system activates the flat panel display power management system 195 and the cursor 340 is on the pull-down menu 310. As illustrated in FIG. 3b, the pixels that comprise pull-down menu 310 receive more power than the other pixels such that the pull-down menu 310 remains clearly visible to the user. The remainder of the pixels receive significantly reduced power such that the amount of power consumed by the display screen is drastically reduced.

Figure 3C:
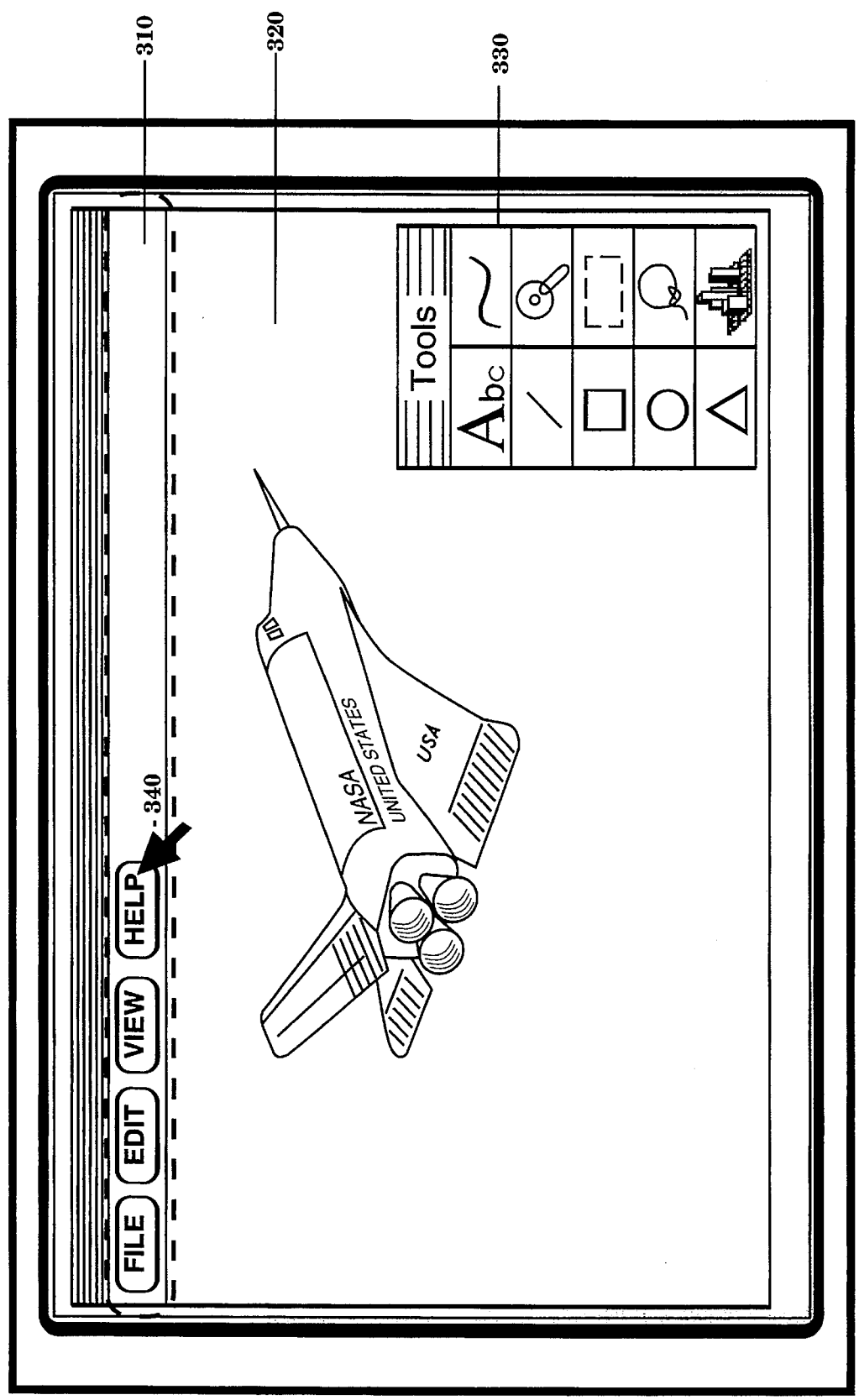
FIG. 3c illustrates the screen display of a portable computer system of FIG. 3a when the flat panel display power management system is activated and all pixels on the flat panel display receive reduced power.

FIG. 3c illustrates an alternate embodiment of how the display screen may appear if the user or the software activates the flat panel display power management system 195 and the cursor 340 is on the pull-down menu 310. As illustrated in FIG. 3c, the pixels that comprise pull-down menu 310 receive more power than the other pixels. However, the power provided to the pixels comprising the pull-down menu 310 is not full power such that even the pixels important area receive reduced power. Again, the remainder of the pixels on the display screen receive significantly reduced power such that the amount of power consumed by the display screen is reduced.

Figure 3D:
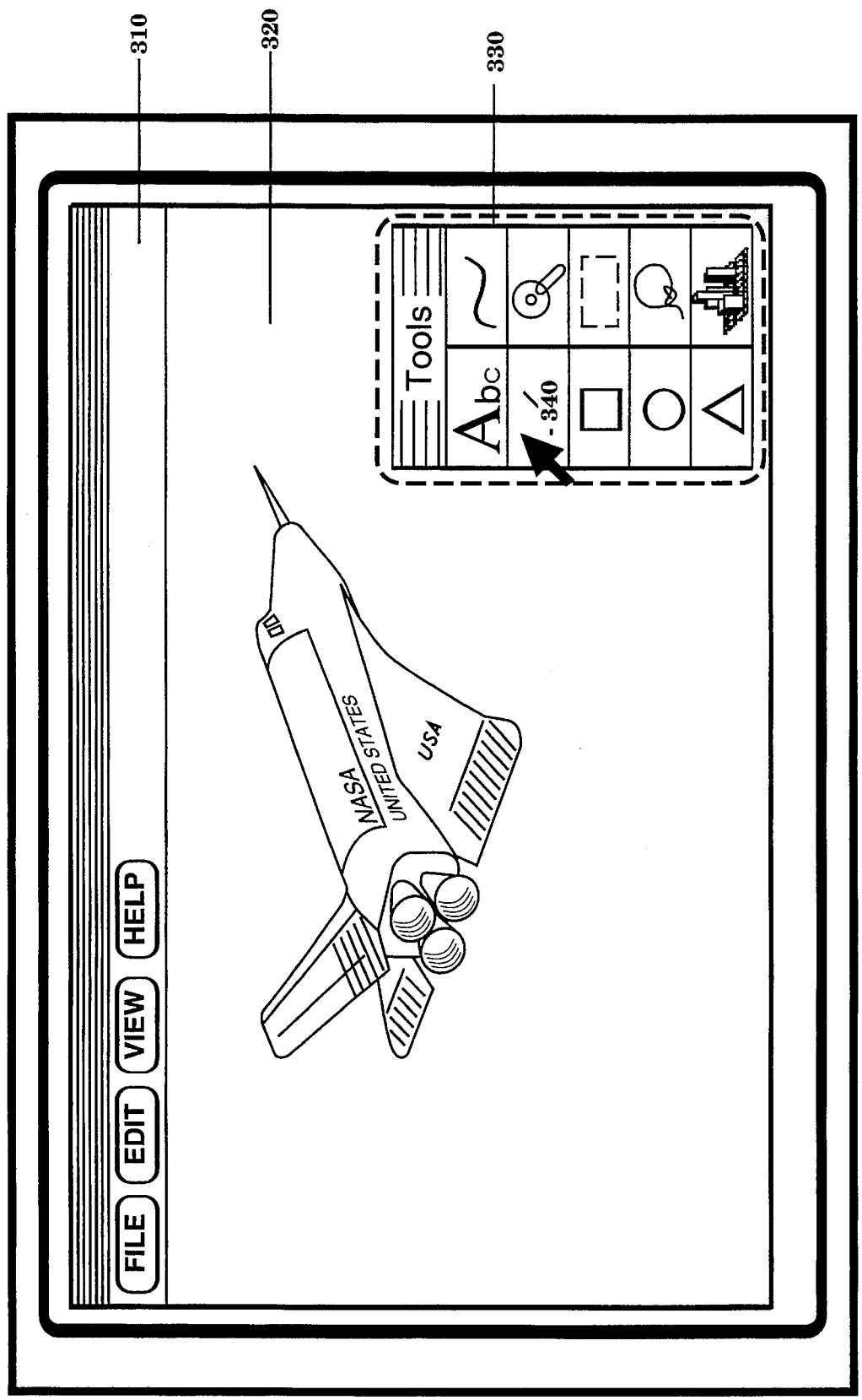
FIG. 3d illustrates the screen display of a portable computer system of FIG. 3a when the flat panel display power management system is activated and the cursor is on the toolbar.

FIG. 3d illustrates how the display screen appears when the user or the software enables the flat panel display power management system 195 and the cursor 340 is on the drawing toolbar 330. As illustrated in FIG. 3d, the pixels that comprise drawing toolbar 330 receive more power than the other pixels such that the drawing toolbar 330 remains visible to the user. Thus, the drawing program adjusts the subset of pixels considered to be important based upon the position of the cursor 340.

Figure 3E:
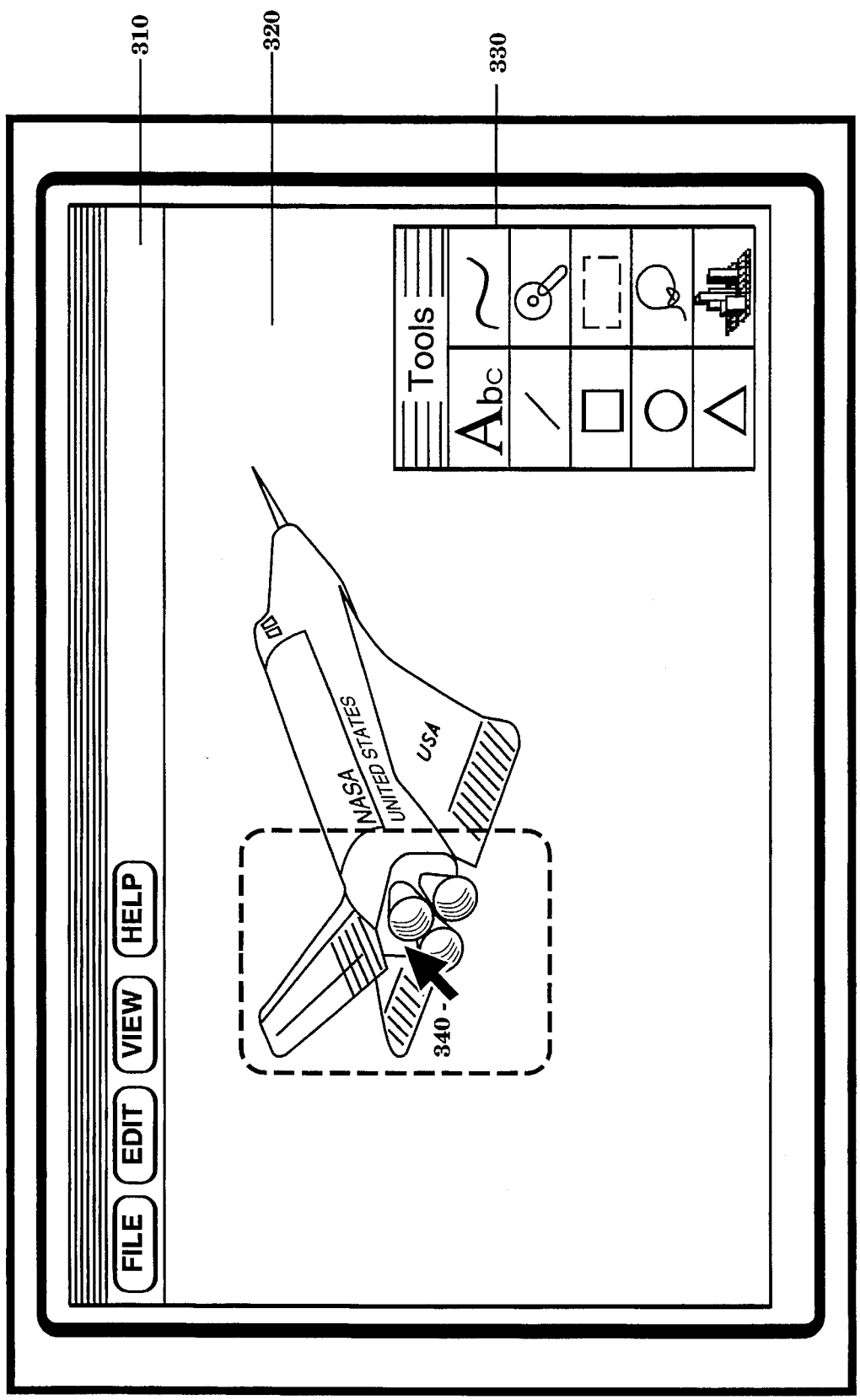
FIG. 3e illustrates the screen display of a portable computer system of FIG. 3a when the flat panel display power management system is activated and the cursor is in the main drawing area.

FIG. 3e illustrates how the display screen may appear if the user or the software enables the flat panel display power management system 195, and the cursor 340 is in the main drawing area 320. As illustrated in FIG. 3e, a rectangle of pixels in the main drawing area 320 that surround the cursor receive more power than the other pixels such that the area where the user is working remains visible to the user.

Figure 3F:
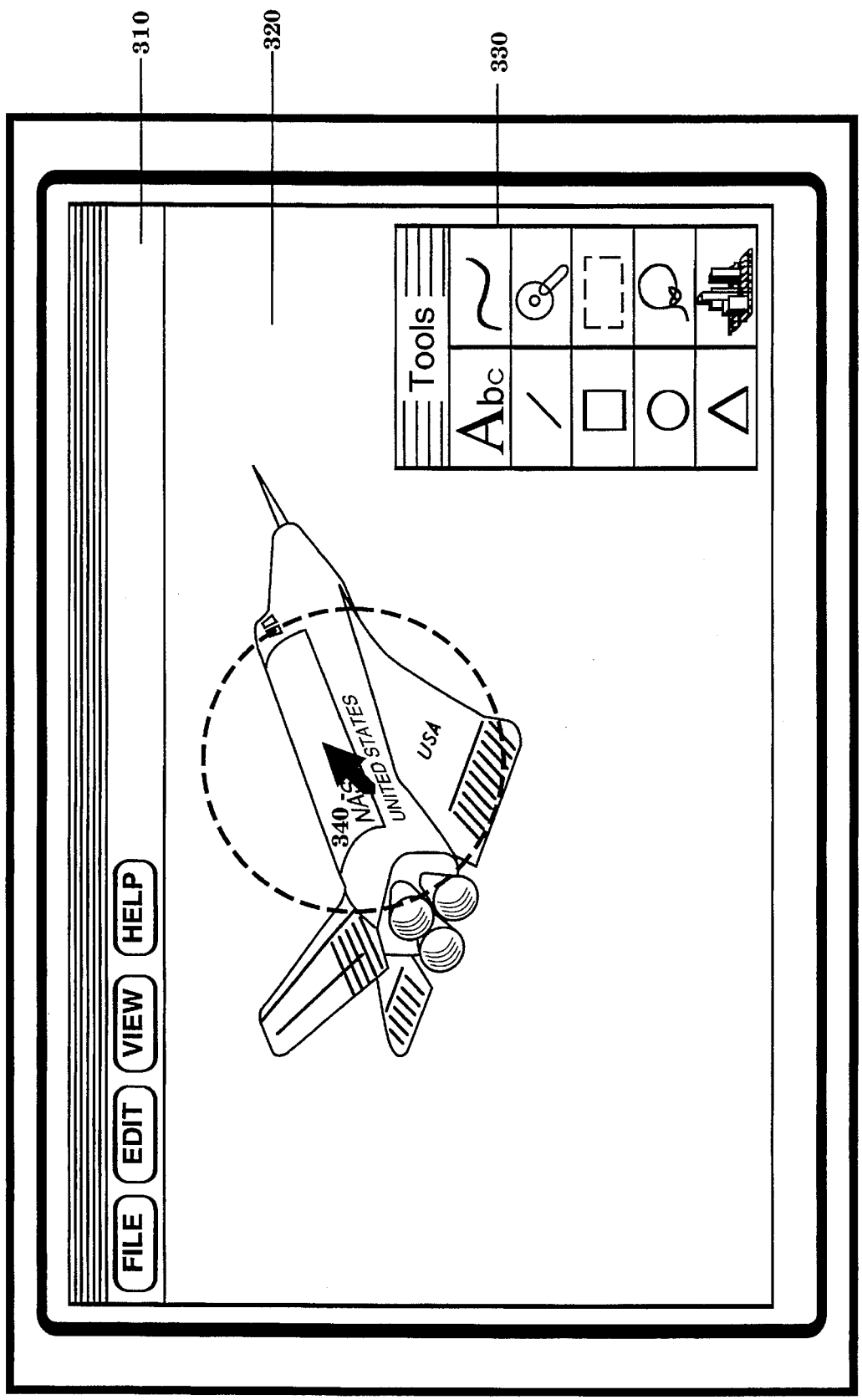
FIG. 3f illustrates an alternate embodiment of the screen display of FIG. 3e when the flat panel display power management system is activated and the cursor is in the main drawing area.

FIG. 3f illustrates an alternate embodiment of how the display screen may appear if the user or the operating system enables the flat panel display power management system 195 and the cursor 340 is in the main drawing area 320. As illustrated in FIG. 3f, a circle of pixels surrounding the cursor 340 in the main drawing area 320 receive more power than the other pixels on the display. In a drawing program, a circle of pixels surrounding the cursor 340 may provide a better focus area.

Figure 4A:
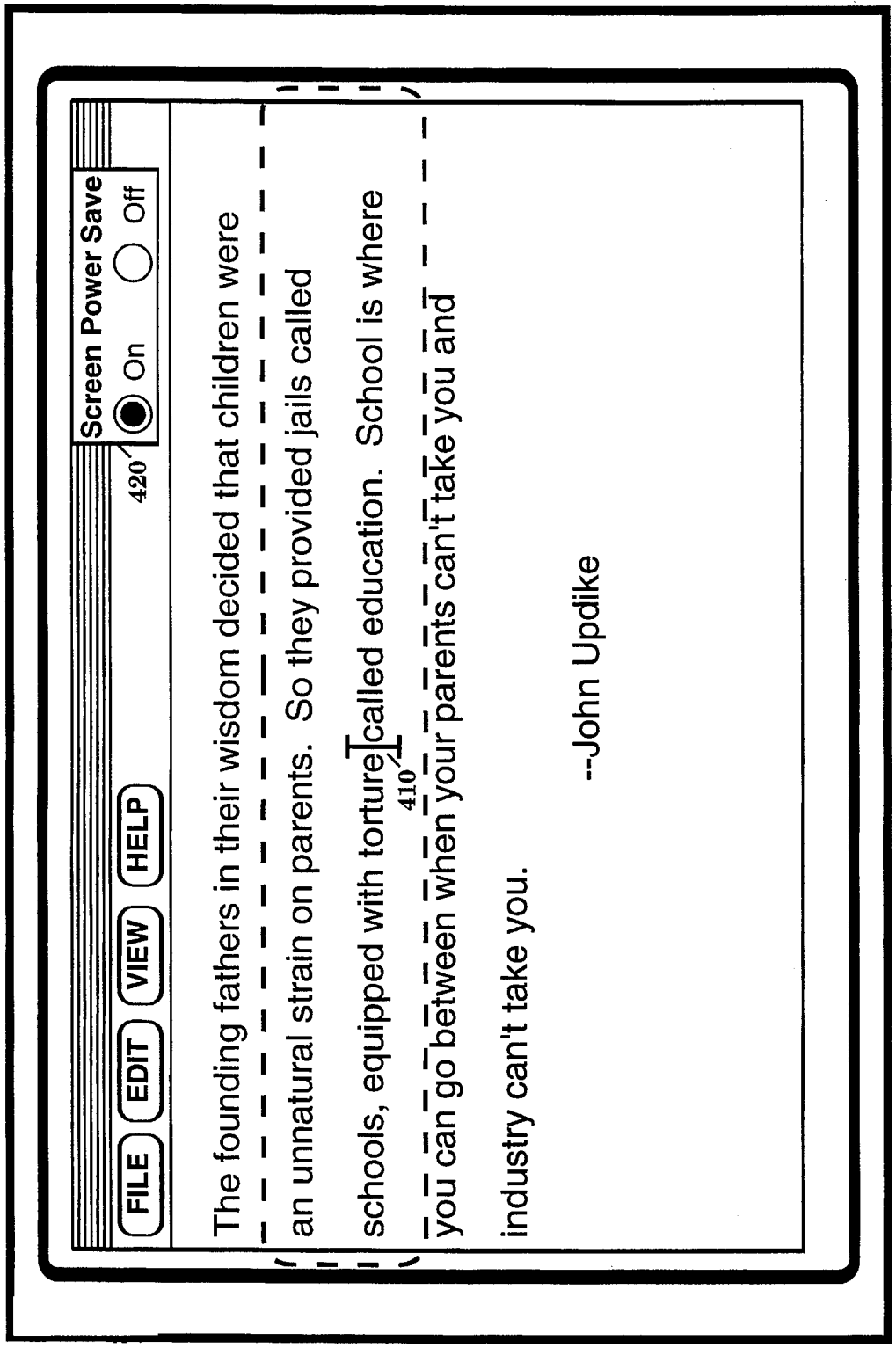
FIG. 4a illustrates the screen display of a portable computer system running a word processing program when the flat panel display power management system is activated and an I-beam cursor is in the text area.
Figure 4B:
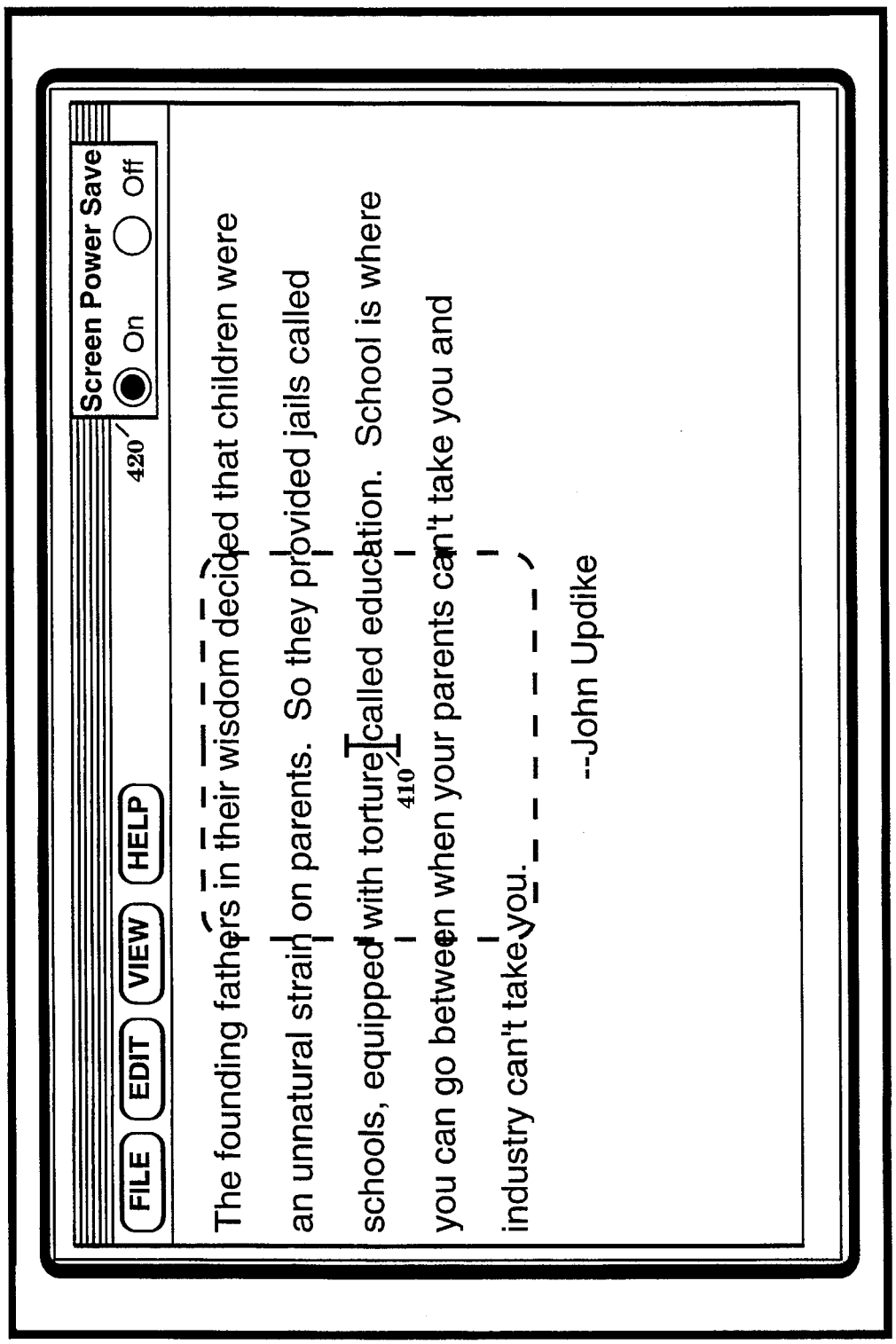
FIG. 4b illustrates the screen display of a portable computer system running a word processing program that does not configure the flat panel display power management system.
Figure 4C:
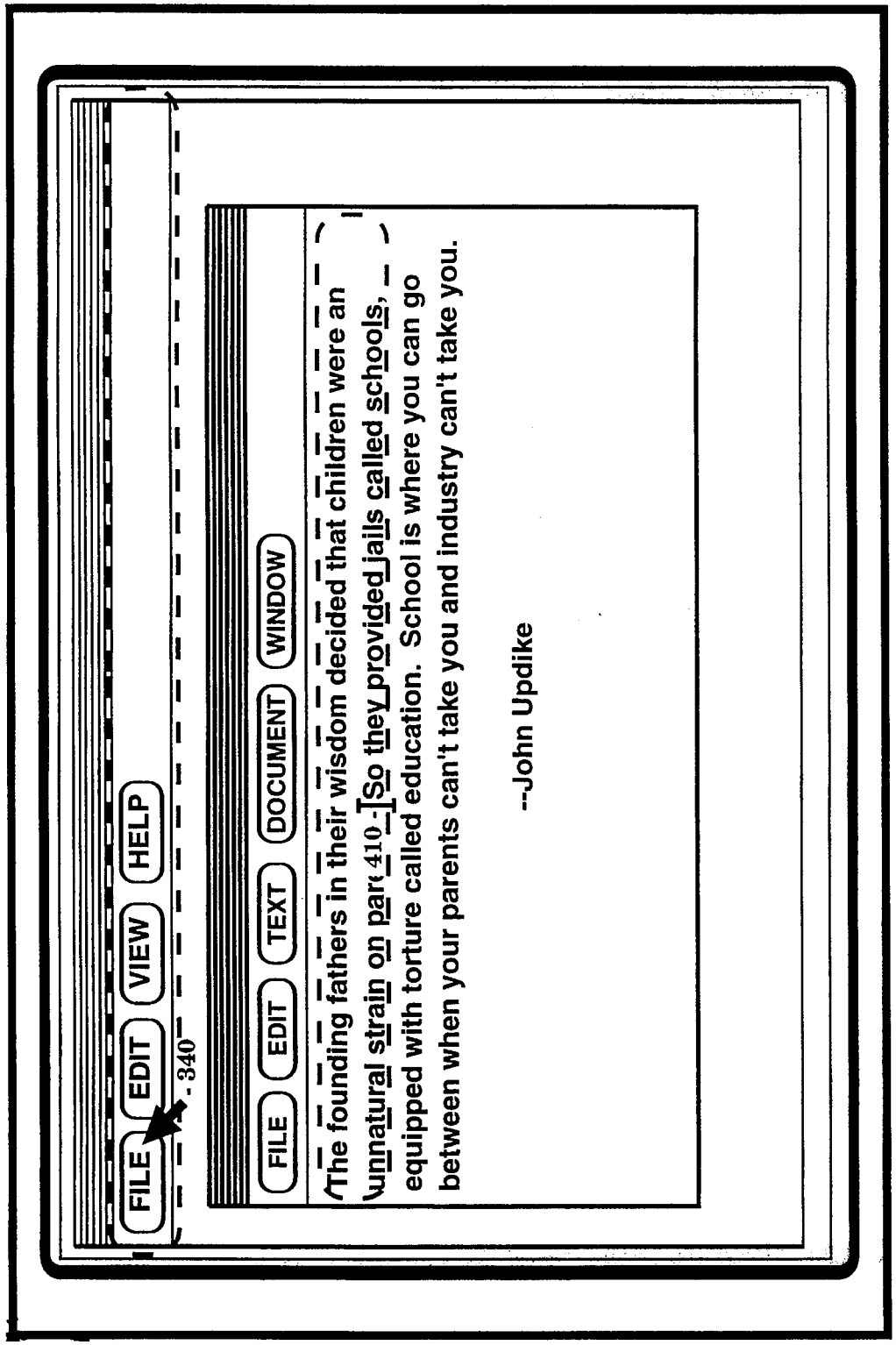
FIG. 4c illustrates the screen display of a portable computer system configured in a manner that allows more than one area on the display to be designated as the important area.

As stated above, each individual software program can configure how the flat panel display power management system 195 will reduce power to the flat panel display system. FIGS. 4a, 4b, and 4c illustrate a second example of how a program can select the pixels that will be receive reduced power.

FIG. 4a illustrates how a word processing program appears after the flat panel display power management system 195 has been activated manually by the user of the system using screen power save checkbox 420. The word processing program uses an "I-beam" cursor 410 to indicate where any text typed by the user will appear next. As illustrated in FIG. 4a, the word processing program causes the flat panel display power management system 195 to provide greater power to the pixels of two adjacent lines of text wherein the second line of text is the line of text containing the I-beam cursor 410. The remaining pixels receive significantly reduced power. The configuration illustrated in FIG. 4a is ideal for a situation where the user only plans to input information and thus is not concerned with be able to see the surrounding text. For example, if the user is in a meeting taking notes for future use, the user can manually enter the reduced power mode such that the battery lifetime will be extended.

Not all software programs will configure the flat panel display power management system 195 with a set of pixels that should receive more power than the remaining pixels. If the flat panel display power management system 195 is not configured with a set of important pixels that should receive more power than the remaining pixels in a reduced power state, the flat panel display power management system 195 can enter a default reduced power state. In the default reduced power state, the flat panel display power management system 195 simply provides more power to the pixels comprising a rectangle surrounding the cursor.

FIG. 4b illustrates how the word processing program of FIG. 4a can appear if the word processing program does not configure the flat panel display power management system 195. As illustrated in FIG. 4b, the default reduced power state causes the flat panel display power management system 195 to provide full power to the pixels that define a rectangle surrounding the I-beam cursor 410.

The user may not always concentrate on a single focus area. For example, when there is more than one cursor on the display, the user may focus his attention on both cursor positions. In order to accommodate such situations, the flat panel display power management system 195 of the present invention can be constructed in a manner that allows more than one area on the display to be designated as the important area. FIG. 4c illustrates an example of this situation.

Referring to FIG. 4c, a word processing program is running in a window on the flat panel display. Within the word processing program window is I-beam cursor 410.

Also on the display is pointer cursor 340. FIG. 4c illustrates how both the text around I-beam cursor 410 and the pull-down menu bar under pointer cursor 340 received more power than the rest of the display.

If the flat panel display power management system 195 remains in the low power state for an extended period of time, the flat panel display power management system 195 can enter an extra low power mode. In the extra low power mode, the flat panel display power management system 195 turns off all the pixels on the flat panel display system. To remind the user that the portable computer device is still on, the flat panel display power management system 195 occasionally flashes the important pixels selected for the normal reduced power mode.

Screen Power Management System for Dynamic Images

Flat panel display systems are increasingly being used to display dynamic images. For example, portable television systems, hand-held video games, and computer systems utilizing animation all display dynamic images.

The present invention can be used to reduce the power used by a flat panel display system that is displaying a dynamic image. To reduce the power used by a flat panel display system displaying dynamic images, the flat panel display power management system 195 reduces the pixels updates to unimportant areas. As explained earlier, this technique can also be applied to flat panel display systems that rely on backlighting, such as passive matrix flat panel display systems and active matrix flat panel display systems. An example of this technique is provided with reference to FIG. 5.

Figure 5:
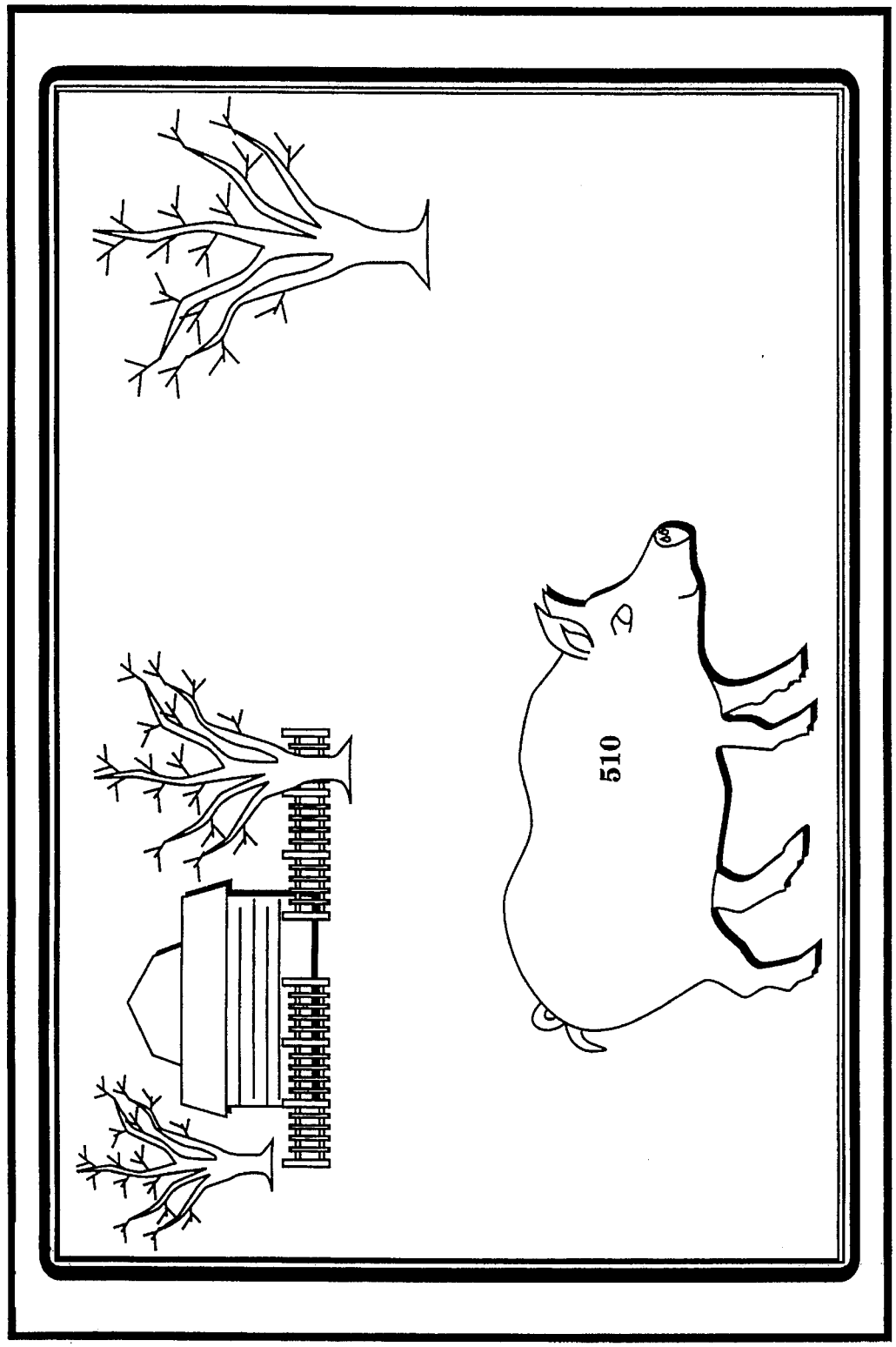
FIG. 5 illustrates a single frame of a screen display of a portable television or animated computer display configured in a manner that illuminates the pixels in a foreground image and reduces power to the pixels of the background images.

Referring to FIG. 5, a single frame of a screen display of a portable television or animated computer display in which important foreground information is displayed full power and less important background information receives less power. As illustrated in FIG. 5, the pig 510 moving around in the foreground is displayed with full power. The remaining pixels comprising the background are not refreshed as often since those pixels are associated with a static background. The pixels receiving full power change on a frame-by-frame basis depending upon important information for that frame.

In the foregoing specification, the invention has been described with reference to the specific embodiment of a portable computer system. However, it will be evident that various modifications and changes may be made thereto without departing from the broader spirit and scope of the invention as set forth in the following claims. Thus, it will be appreciated by those skilled in the art that the teachings of the present invention can be incorporated into any electronic device that incorporates a flat panel display system. For example, the teachings of the present invention can be applied towards portable televisions and hand-held video games that are constructed using a flat panel display system. Accordingly, the specification and drawings are to be regarded in an illustrative sense rather than a restrictive sense.

What is claimed is:

1. An apparatus for conserving power in a portable electronic device, said apparatus comprising:

a flat panel display system, said flat panel display system providing an output display for said portable electronic device, said flat panel display system comprising a plurality of individual pixels;

a flat panel display power management system, said flat panel display power management system coupled to said flat panel display system, said flat panel display power management system providing a controllable amount of power to each of said plurality of individual pixels such that each of said plurality of individual pixels may be displayed at a different level of visibility;

a processor in said electronic device; and a software program running on said processor in said portable electronic device, said software program configuring said flat panel display power management system such that said software program determines a subset of said plurality of pixels that will receive more power than pixels not in said subset if said flat panel display power management system enters an active state.

2. An apparatus for conserving power in a portable electronic device, said apparatus comprising:

a flat panel display system, said flat panel display system providing an output display for said portable electronic device, said flat panel display system comprising a plurality of individual pixels;

a cursor displayed on said flat panel display system; and a flat panel display power management system, said flat panel display power management system:
coupled to said flat panel display system;
providing a controllable amount of power to each of said plurality of individual pixels such that each of said plurality Of individual pixels may be displayed at a different level of visibility; and
having a default reduced power mode, said default reduced power mode providing more power to a subset of pixels defining a shape around said cursor than to pixels not within said subset.

3. An apparatus for conserving power in a portable electronic device, said apparatus comprising:

a flat panel display system, said flat panel display system providing an output display for said portable electronic device, said flat panel display system comprising a plurality of individual pixels; and a flat panel display power management system, said flat panel display power management system:
coupled to said flat panel display system;
providing a controllable amount of power to each of said plurality of individual pixels such that each of said plurality of individual pixels may be displayed at a different level of visibility; and
having an extra low power mode, said extra low power mode turning off all of said plurality of pixels and periodically flashing said subset of pixels.

4. The apparatus for conserving power in a portable electronic device as claimed in claim 1 wherein said flat panel display system comprises an electroluminescent display system.

5. The apparatus for conserving power in a portable electronic device as claimed in claim 1 wherein said flat panel display system comprises a field-emission cathode display system.

6. The apparatus for conserving power in a portable electronic device as claimed in claim 1 wherein said flat panel display system comprises a gas-plasma display system.

7. The apparatus for conserving power in a portable electronic device as claimed in claim 1 wherein said flat panel display system comprises a Light Emitting Diode (LED) display system.

8. A method for conserving power in a portable electronic device, said method comprising the steps of:

selecting a subset of important pixels from a flat panel display system that comprises a plurality of pixels;

configuring a flat panel display power management system in said portable electronic device by providing said subset of important pixels to said flat panel display power management system; and entering a reduce power mode wherein said flat panel display power management system provides more power to said subset of important pixels than to pixels not within said subset.

9. The method for conserving power in a portable electronic device as claimed in claim 8 wherein said steps of selecting a subset of important pixels and configuring a flat panel display power management system are performed by a software program running on said portable electronic device.

10. The method for conserving power in a portable electronic device as claimed in claim 8 wherein said steps of selecting a subset of important pixels and configuring a flat panel display power management system are not performed then said flat panel display power management system enters a default reduced power mode, said default reduced power mode providing more power to a subset of pixels defining a shape around a cursor on said flat panel display than to pixels not in said subset of pixels defining a shape around said cursor.

11. The method for conserving power in a portable electronic device as claimed in claim 8 wherein said flat panel display power management system further comprises an extra low power mode, said extra low power mode turning off all of said plurality of pixels and periodically flashing said subset of important pixels.

12. The method for conserving power in a portable electronic device as claimed in claim 9 wherein said flat panel display system comprises an electroluminescent display system.

13. The method for conserving power in a portable electronic device as claimed in claim 9 wherein said flat panel display system comprises a field-emission cathode display system.

14. The method for conserving power in a portable electronic device as claimed in claim 9 wherein said flat panel display system comprises a gas-plasma display system.

15. The method for conserving power in a portable electronic device as claimed in claim 9 wherein said flat panel display system comprises a Light Emitting Diode (LED) display system.

16. An apparatus for conserving power in a portable electronic device, said apparatus comprising the elements of:

a flat panel display system, said flat panel display system providing an output display for said portable electronic device, said flat panel display system comprising a plurality of individual pixels; and a flat panel display power management system, said flat panel display power management system coupled to said flat panel display system, said flat panel display power management system providing a controllable amount of power to each of said plurality of individual pixels such that each of said plurality of individual pixels may be displayed at a different level of visibility, said flat panel display power management system also for reducing the rate at which each of said plurality of individual pixels changes display states, allowing each of said plurality of individual pixels to be refreshed at different times.

17. The apparatus for conserving power in a portable electronic device as claimed in claim 16 wherein said flat panel display system comprises an active matrix liquid crystal display system.

18. The apparatus for conserving power in a portable electronic device as claimed in claim 16 wherein said flat panel display system comprises a passive matrix liquid crystal display system.

* * * * *